United States Patent [19]

Coccaro

[11] Patent Number: 4,854,803
[45] Date of Patent: Aug. 8, 1989

[54] APPARATUS AND METHOD FOR JACKING AND DOLLYING AN AFFIXED VEHICLE WHEEL ASSEMBLY

[76] Inventor: Albert V. Coccaro, 9 Capricorn La., Mount Kisco, N.Y. 10549

[21] Appl. No.: 120,871

[22] Filed: Nov. 16, 1987

[51] Int. Cl.$^4$ .............................................. B60B 29/00
[52] U.S. Cl. .................. 414/429; 74/577 M; 254/111; 414/786
[58] Field of Search .................... 414/426-430, 414/786; 254/108, 111; 74/146, 157, 577 M

[56] References Cited

U.S. PATENT DOCUMENTS

| | | | |
|---|---|---|---|
| 1,275,716 | 8/1918 | Maurer, Jr. | 414/429 |
| 1,459,194 | 6/1923 | Burkholder | 254/111 |
| 1,571,132 | 1/1926 | Marchesseault | 254/111 |
| 2,179,577 | 11/1939 | Lacker | 254/111 |
| 2,217,898 | 10/1940 | Gemmill | 414/427 |
| 2,249,050 | 7/1941 | Schmidt | 254/111 |
| 2,332,443 | 10/1943 | Foringer | 414/429 |
| 2,362,981 | 11/1944 | Baum | 414/428 |
| 2,380,415 | 7/1945 | Carruthers | 414/429 |
| 3,145,859 | 7/1961 | Barosko | 414/427 |
| 3,954,198 | 5/1976 | Sedelmayer | 414/429 |
| 4,401,405 | 3/1983 | Ealet | 414/428 |
| 4,690,605 | 9/1987 | Coccaro | 414/429 |
| 4,692,082 | 9/1987 | Smith | 414/429 |

FOREIGN PATENT DOCUMENTS

2419177  11/1979  France ................................ 414/427

*Primary Examiner*—David A. Bucci
*Attorney, Agent, or Firm*—Paul C. Scifo

[57] ABSTRACT

Apparatus and method for jacking and dollying a vehicle wheel assembly, while the assembly remains affixed to the vehicle, the wheel assembly including a pneumatic tire, a wheel and an axle. The apparatus features a "U" shaped framework having telescoping body section members to which orthogonally extending arms are attached. Wheel assembly engaging elements in the form of roller assemblies are mounted on the framework arms for engaging the tire of a wheel assembly located therebetween for lifting. The apparatus also includes an actuator mounted on the framework body section members for driving the roller assemblies against the wheel assembly tire to cause lift, and form the framework and roller assemblies into a carriage for retaining the wheel assembly. Still further, the framework is mounted on casters to enable transport of the supported wheel assembly and framework. The actuator is preferably foot operated and includes a bi-directional, double pawl, lever ratchet mechanism having a lever pivotally mounted to one body section member together with a first and a second pawl, and a rack provided at the other body section member. The actuator also includes direction control elements having a first setting to enable the apparatus to lift the wheel assembly, and a second setting to enable the apparatus to lower the wheel assembly. The method features steps for driving a plurality of wheel engaging elements, at least one of which includes a roller assembly, against the tread face of the tire of the wheel assembly to be lifted by leveraging for a predetermine distance the coupling member of one wheel engaging element from a fulcrum located on the coupling member of another wheel engaging element, then bracing the coupling members against separation, and thereafter, resetting and re-leveraging to successively drive the wheel engaging elements against the wheel assembly to produce lift.

20 Claims, 6 Drawing Sheets

APPARATUS AND METHOD FOR JACKING AND DOLLYING AN AFFIXED VEHICLE WHEEL ASSEMBLY

BACKGROUND OF THE INVENTION

1. Field Of The Invention

This invention concerns an improved apparatus and method for jacking and dollying a vehicle wheel assembly, while the assembly remains affixed to the vehicle, the wheel assembly including a pneumatic tire, a wheel and an axle; and more particularly, a jacking an dollying apparatus having wheel assembly engaging elements and an actuator, wherein the wheel assembly engaging elements include one or more roller assemblies, and the actuator includes a bi-directional, double pawl, lever ratchet mechanism, and wherein the method includes steps for successively driving the wheel assembly engaging elements against the tire to lift the wheel assembly by alternate leveraged driving and bracing of members which couple the wheel assembly engaging elements, and steps for permitting the wheel assembly to successively repulse the wheel assembly engaging elements to lower the wheel assembly by alternate leveraged releasing and resetting of the bracing between members which couple the wheel assembly engaging elements.

2. Description of Related Art

As pointed out in my U.S. Pat. No. 4,690,605, issued Sept. 1, 1987, entitled "Apparatus For Jacking And Dollying An Affixed Vehicle Wheel Assembly", movement of conventional vehicles in confined spaces such as found in repair garages, body shops, and parking facilities, is difficult at best, and can be impossible altogether.

The movement difficulties associated with front wheel steering arise from its inherent limitations. As all drivers have found, front wheel steering permits vehicle movement in only straight line and relatively broad arcuate paths. As a result, where right angle, rotational or shallow arcuate paths are required, movement may not be possible unless sufficient space exists within which to approximate such paths with a series of straight line and broad arc maneuvers.

Meeting such space requirements, however, can create problems. In commercial settings such as garages, body shops and parking facilities, providing sufficient space to accommodate front wheel steering may require servicing fewer vehicles, increasing floor space, or some combination of the two. But accommodating fewer vehicles and providing larger space adversely affects economics. They entail either loss of operating revenue due to the reduced number or vehicles served or additional capital outlay for construction of increased space. Further, even in non-commercial settings, space limitations and economics may prohibit accommodation of the number of vehicles of choice.

However, as described in my above referenced patent, if a vehicle where free to swivel about its vertical axis; as for example, where the vehicle where mounted on a dolly, the limitations of front wheel steering could be overcome and the economics of vehicle accommodation substantially improved.

But, the complexity of providing a suitable dolly, and the loading and unloading of a vehicle to and from it is not insignificant. Such a dolly would have to have a capacity sufficient to sustain the size and weight of the vehicle. Accordingly, the device would be expected to have a costly and bulky construction. Additionally, means would have to be provided for lifting the vehicle from the ground onto the dolly, and from the dolly back to the ground again, adding further cost and complexity.

As also pointed out in my above noted patent, an alternative to lifting the entire vehicle onto a single dolly would be to use individual jacking and dollying units placed at each vehicle wheel assembly. Use of individual units capable of both lifting the wheel assembly and carrying it while affixed would permit each wheel assembly to be raised from the ground, and once raised, effectively swiveled by means of casters provided on the unit.

Further, use of individual wheel jacking and dollying units would have the added advantage of permitting movement of vehicles immobilized because of one or more disabled wheel assemblies. Where a broken or damaged assembly has immobilized the vehicle, the vehicle could be made movable again by mounting the disabled assembly on an individual dolly unit, the action of the units casters being substituted for the disabled wheel assembly.

While in the past, wheel jacking and dollying devices have been proposed, some for transporting wheel assemblies while the assembly remains affixed to the vehicle, and, others for, more simply, removing a wheel and tire from a vehicle and, thereafter, transporting the removed wheel and tire, both types have lacked the ease of use and simplicity of construction to render them attractive, especially for commercial use.

More particularly, devices have been proposed for removing vehicle wheels and tires from a vehicle axle, and transporting them once removed. These devices were intended to facilitate tire and wheel replacement where the tires or wheels were worn, damaged or flat, and too large and heavy to be conveniently replaced by hand; for example, tires and wheels of trucks and buses.

However, these devices are limited. In operation, they require use of an auxiliary jack to first lift the vehicle to remove the vehicle weight from the wheel assembly. Thereafter, the device is positioned beneath the tire and wheel so tire and wheel can be taken off and transported away. What jacking ability they have is directed to lifting the tire and wheel form the already raised and supported axle. The wheel engaging elements and actuator mechanism they feature are not intended to provide a mechanical advantage suitable for lifting the entire vehicle.

But, use of a separate jack to first lift and support the vehicle is unattractive. It requires extra time and effort to first position 80 and actuate the auxiliary jack, and there is the added cost of the auxiliary jack itself.

As a further drawback, these devices tend to have awkward and slow acting mechanisms which do not provide simple and convenient operation. Further, they typically have a size and shape that would encumber movement if the vehicle could be moved once on the device.

An example of such a device is given in U.S. Pat. No. 2,380,415, issued July 31, 1945, to E. R. Carruthers. In his patent, Carruthers describes a tire and wheel dolly intended to handle the dual rear wheels of a truck. In accordance with his design, a separate jack is needed to lift the truck axle, wheel and tires from the ground so that the apparatus can be rolled beneath. Thereafter, cradles provided on the apparatus are brought beneath and against the tires by means of a crank and screw mechanism, to lift the tires and wheels from the supported axle. Accordingly, the Carruthers apparatus requires the undesirable step of and equipment for separately lifting the wheel assembly before the apparatus can be used. Further, because of the crank and screw actuator mechanism, the Carruthers design is not susceptible of quick, simple manipulation.

Other and similar examples of tire and wheel dollies are found in U.S. Pat. Nos. 1,967,119; 2,170,607; 2,217,898; 2,386,516; 2,410,902; and 3,836,027. However, as in the case of the Carruthers apparatus, a separate jack is required to first lift and support the vehicle. Yet further, the bulk and complexity of these devices would encumber vehicle movement if the vehicle could be sustained on the device, and their actuator mechanisms are not suited to simple and quick operation.

A tire and wheel dolly of the above described type featuring a simplified construction, however, has been proposed in French patent No. 2,419,177 issued to Jean-Pierre Jacques, and published Oct. 5, 1979. In accordance with the Jacques design, a manually operable lever mechanism is arranged to drive rollers against the tread face on opposite sides of a tire to be lifted. As the rollers are forced against the tread, the tire is caused to ride onto the rollers and be lifted from the vehicle axle.

But, as with the previously described devices, the Jacques apparatus calls for use of a separate jack to first lift the vehicle axle. Further, in the case of the Jacques apparatus, the rudimentary nature of the lever mechanism and the action of the rollers render use of a separate jack even more necessary. Because of the roller pincer action, the apparatus must provide sufficient force to both lift the wheel and tire, and, overcome drag resistance of the tire to the rollers. While drag is typically not significant where the tire is unloaded, deformation of the tire in the presence of the vehicle weight; e.g., if the auxiliary jack is not used, does render drag significant, and a problem where the pneumatic tire is under inflated. Accordingly, the Jacques apparatus not only exhibits the cost and operating disadvantages associated with use of an auxiliary jack, but also, the potential further problem of required additional mechanical advantage to overcome the effect of tire drag resistance.

As noted, other devices have been proposed for jacking and dollying affixed wheel assemblies, and are able to do so without the aid of an auxiliary jack. But, these devices require use of slow acting and complicated actuator mechanism to accomplish lifting, and for this reason are also unattractive.

More particularly, in U.S. Pat. No. 2,362,981, C. P. Baum proposes an apparatus for parking airplanes. The apparatus features, in several embodiments, wheel engaging elements and various crank and lever actuators for lifting and supporting an aircraft wheel assembly. The design of the wheel engaging elements and actuator mechanisms, however, call for complicated and costly construction, and require awkward manipulation in operation. Thus the device is unsuited for usage where low manufacturing cost and simple operation are desired.

Finally, while a more conveniently operated apparatus has been proposed for transporting affixed vehicle wheel assemblies, the apparatus has been provided with adequate lift capacity and made more convenient to operate at the cost of rendering the actuator mechanism even more complicated and expensive than the previous, all mechanical designs.

In U.S. Pat. No. 3,954,198, F. X. Sedelmeyer describes a lift truck for raising vehicle wheel assemblies to permit vehicle movement in confined spaces or towing in the case where the wheel assembly is jammed. The Sedelmeyer apparatus features rollers mounted on a telescoping framework that is actuated by a multi-piston, multi-chambered hydraulic system. In accordance with the Sedelmeyer design, manual manipulation of the hydraulic pump associated with the framework causes the rollers to be driven against the wheel assembly tire, to thereby lift the assembly.

While the Sedelmeyer hydraulic pump is able to provide adequate lift capacity and convenient operation, the complexity of the pump mechanism with its multiple pistons, chambers and valves, renders the apparatus costly to manufacture. Additionally, because the apparatus is hydraulic, it is subject to leakage and slippage, aspect which further detract from its desirability.

SUMMARY OF INVENTION

It is therefore an object of this invention to provide an apparatus capable of both jacking and dollying a vehicle wheel assembly while the assembly remains affixed to the vehicle.

It is a further object of the invention to provide a vehicle wheel assembly jacking and dollying apparatus capable of simple and convenient actuation to facilitate ease of use.

It is a still further object of this invention to provide a vehicle wheel assembly jacking and dollying apparatus of reduced complexity to minimize manufacturing cost.

It is a yet further object of this invention to provide a vehicle wheel assembly jacking and dollying apparatus having a mechanical actuator to assure positive, non-slip operation during lifting and lowering of the wheel assembly.

It is still another object of this invention to provide a vehicle wheel assembly jacking and dollying apparatus having a mechanical actuator which does not encumber or impede movement of the vehicle when the wheel assembly is lifted.

Briefly, the apparatus in accordance with this invention achieves the desired objectives by featuring a simplified mechanical actuator mounted upon the apparatus framework for driving wheel engaging elements, also mounted on the framework, against the tire of a vehicle wheel assembly so as to lift the wheel assembly and form the framework into a carriage for retaining the assembly.

In accordance with the invention, the framework is comprised of structural means including a body section having a first member slidably received in a second member. Additionally, the framework includes a first arm member attached to the body section first member and a second arm member attached to the body section second member. The framework arm members are oriented to extend from the body section in a direction approximately orthogonal to the body section longitudinal axis to form a generally "U" shaped structure.

Wheel engaging elements which define a wheel engaging means are mounted on the apparatus, and include, in preferred form, roller assemblies mounted on one or each of the framework arm members.

As noted, the apparatus features a simplified mechanical actuator. More particular, the actuator includes a lever means, a drive member, a brace member and means for receiving the drive and brace members, all of which cooperate to lift the wheel assembly in predetermined increments. When repeatedly operated, the actuator draws the body section second member into the body section first member in successive increments, forcing the wheel engaging roller assemblies mounted on one or each framework arm member against the tire tread of a wheel assembly position between the arm members.

As the body section members are drawn together, the roller assemblies permit the tire to ride onto the apparatus, thereby lifting the wheel assembly as the wheel engaging means is forced against it. Simultaneously with the lifting of the wheel assembly, the framework is formed into a carriage for retaining the assembly. Further, as the framework body section are successively drawn together, they are braced against one another by the actuator to prevent separation under the vehicle weight, leaving the wheel supported by the framework and wheel assembly engaging elements.

Transport means, which preferably are casters or the like, are provided on the framework to permit dollying of the vehicle once the wheel assembly is supported on the apparatus.

In accordance with the invention, the actuator drive member and brace member are mounted on the lever means so that they align with the receiving means. In this arrangement the lever means includes a lever element, which together with the drive member and brace member are mounted on one body section member, while the receiving means is mounted on the other. Thus, when the lever means is operated, the drive member engages the receiving means to cause one body section member to be driven relative to the other a predetermined distance, and, thereafter, braced against separation from the other by the brace member.

In preferred form, the drive member is a first pawl rotationally mounted to the lever element and the brace member is a second pawl also rotationally mounted to the lever element. Further, the receiving means is a rack having notches for accepting the first and second pawls. More particularly, the lever element is pivotally mounted proximate a first end of the first body member with the second pawl, the second pawl being mounted at the lever pivot. Further, the first pawl is mounted at a point along the length of the lever element displaced from the second pawl. In this arrangement, the first and second pawls are oriented to extend through an opening provided in the body section first member, to engage the notches of the rack mounted on the body section second member.

Also in accordance with the invention, the actuator includes direction control means to configure the actuator so that the actuator may be used to either lift a wheel assembly, or lower a wheel assembly previously raised.

In preferred form, the direction control means includes a resilient element such as a spring plate having one end fixed mounted to the lever so that the body of the plate may engage the first and second pawls. Additionally, the direction control means includes a deflection member; for example, a crank having a cam thereon, which is rotationally mounted in the lever element so that in a first position, the cam deflects the plate from the first and second pawl, to define a configuration for lifting, and so that in a second position, the cam permits the plate to interact with the first and second pawl, to define a configuration for lowering.

This invention also contemplates a method for jacking and dollying a vehicle wheel assembly while the assembly remains affixed to the vehicle.

In accordance with this invention, the method in preferred form comprises the steps of locating a plurality of wheel assembly engaging elements, at least one f which includes a roller assembly, on the tire tread face at points on opposite sides of the wheel assembly vertical center line, and, thereafter, coupling the wheel engaging elements with coupling members oriented in a plane substantially perpendicular to the tread face. Next, the method includes, slidably driving the coupling members relative to one another by leveraging for a predetermined distance the coupling member of one wheel assembly engaging element from a fulcrum on the coupling member of another wheel assembly engaging element. Following leveraging for a predetermined distance, the method calls for one coupling member to be locked against separation from another coupling member by bracing one coupling member against another.

Thereafter, the method calls for repeatedly and alternately driving one coupling member relative to another and bracing one coupling member against another by repeated resetting and releveraging so as to successively drive the wheel assembly engaging element against the tire tread to left the wheel assembly and retain it at a desired height. Finally, this method calls for the raised wheel assembly and wheel engaging means to be transported as desired.

The method of this invention also contemplates preferred steps for lowering a wheel assembly that has been lifted. Particularly, and in accordance with the invention, the wheel assembly is lowered from the raised position by first releasing the bracing between one coupling member and another, and permitting one coupling member to be withdrawn relative to another a predetermined distance by the weight of the wheel assembly until one coupling member is again braced against another. Thereafter, the method calls for repeatedly and alternately releasing and resetting the bracing to successively and controllably permit the wheel assembly to repulse the wheel assembly engaging elements until the wheel assembly is lowered a desired amount.

The foregoing and other objects, features and advantages of the invention will become apparent form the following more detailed description of its preferred embodiments as illustrated in the accompanying figures.

DETAILED DESCRIPTION OF THE INVENTION

As noted, the limitations of front wheel steering render movement of conventional vehicles in limited spaces difficult at best, and at worst impossible. The space requirements of front wheel steering, however, can be overcome with use of a jacking and dollying apparatus placed at the vehicle wheel assemblies. Moreover, where the vehicle is immobilized because of one or more disabled wheel assemblies, the vehicle can be made movable again by mounting each of the disabled assemblies on such an apparatus.

However, to be attractive, the jacking and dollying apparatus must be able to lift a wheel assembly form the ground and carry it while the assembly remains fixed to the vehicle; do so quickly and easily; and have a construction which is compact and simple so as not to interfere with vehicle movement or burden manufacturing cost.

The apparatus and method of this invention overcome the shortcomings of the prior art by providing a simplified, low cost construction and procedure for quickly and conveniently jacking and dollying a wheel assembly while it remains affixed to the vehicle.

Figures 1, 2:
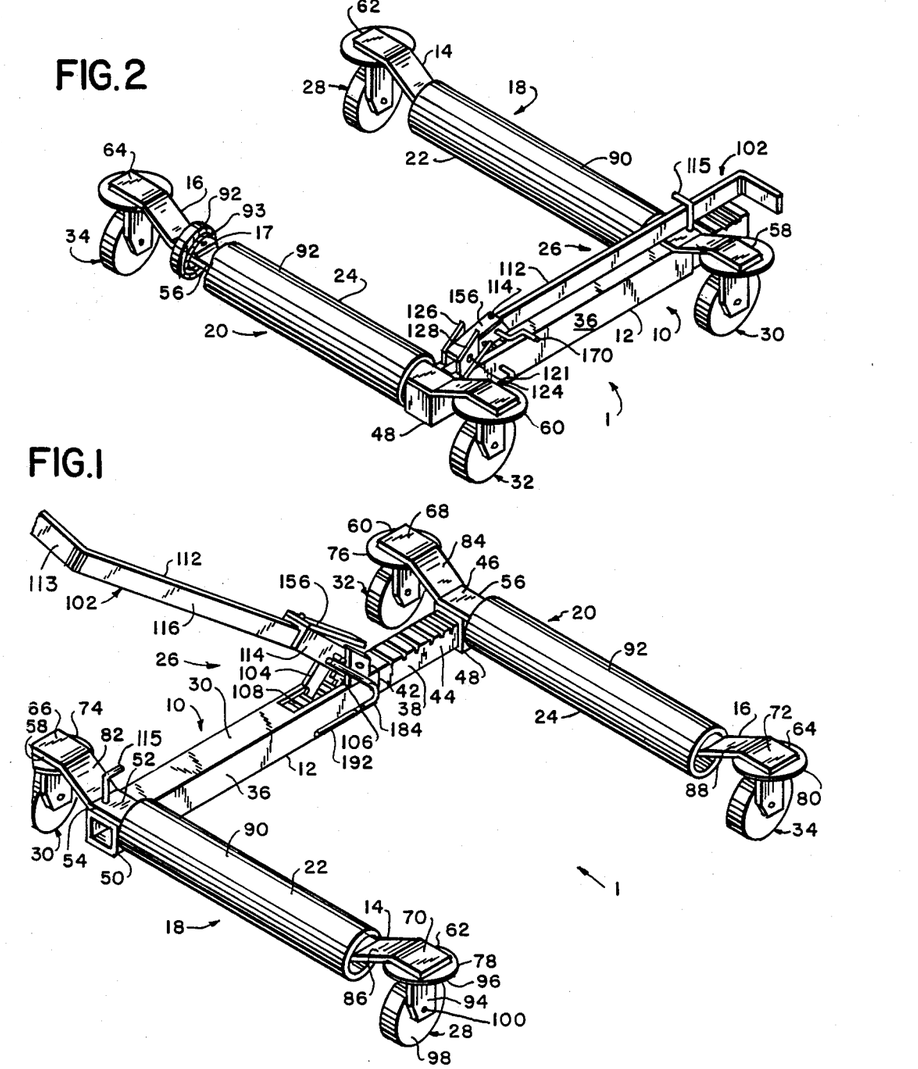
FIG. 1 is a perspective view of a preferred embodiment of the apparatus when it is configured for operation in accordance with this invention.
FIG. 2 is a perspective view of a preferred embodiment of the apparatus when it is configured for storage in accordance with this invention.

The jacking and dollying apparatus of this invention is illustrated in a preferred form in the accompanying figures. As depicted in FIG. 1, apparatus 1 is shown deployed for engaging a wheel assembly to be lifted. As seen in FIG. 1, apparatus 1 includes a generally "U" shaped framework 10 having a telescoping body section 12 to which arm members 14 and 16 are attached. Additionally, apparatus 1 includes wheel assembly engaging elements 18 and 20 in the form of roller assemblies 22 and 24 mounted on framework arm members 14 and 16, respectively. Further, apparatus 1 also includes an actuator 26 mounted on framework body section 12 for driving roller assemblies 22 and 24 toward one another. Finally, apparatus 1 is seen to include transport means in the form of caster assemblies 28, 30, 32 and 34 upon which framework 10 is mounted to facilitate movement of the apparatus.

In accordance with the invention, apparatus 1 and its various elements are made of steel or, as would be appreciated by those skilled in the art, synthetic materials such as high-strength plastics well known in the field.

Figure 4:
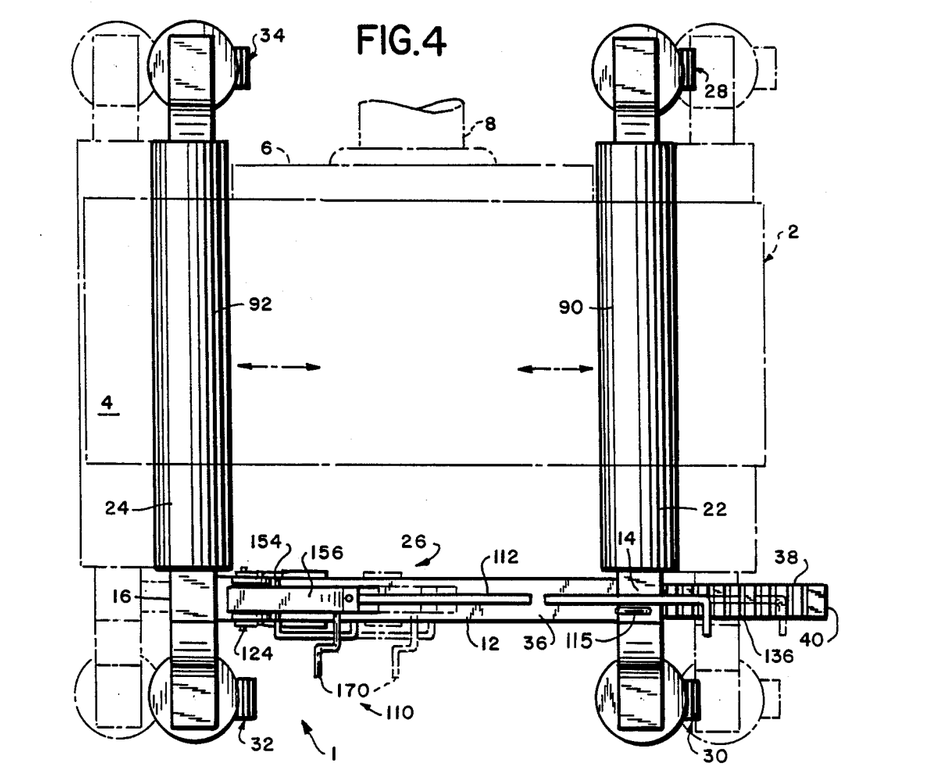
FIG. 4 is a plan view of a preferred embodiment of the apparatus in accordance with this invention together with a wheel assembly to be lifted.
Figure 5:
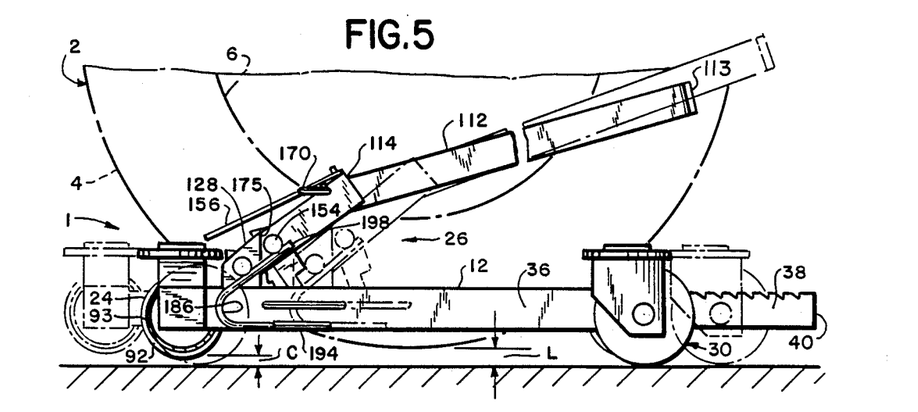
FIG. 5 is a side elevation view of a preferred embodiment of the apparatus in accordance with this invention together with a wheel assembly before and after wheel assembly lift.

As best seen with reference to FIGS. 4 and 5, in operation, apparatus 1 would first be positioned about a vehicle wheel assembly 2, wheel assembly 2 including a pneumatic tire 4 mounted on a wheel 6, wheel 6 itself being mounted on a vehicle axle 8. Thereafter, on operation of an actuator 26, roller assemblies 22 and 24 would be driven against the tread of tire 4 at points on different sides of the wheel assembly vertical center line. As best seen in FIG. 5, as roller assemblies 22 and 24 are driven against the tread of tire 4, forces are exerted on the tire which cause wheel assembly 2 to be lifted form the ground and tire 4 to ride over roller assemblies 22 and 24. During this process, framework 10 and roller assemblies 22 and 24 are formed into a carriage for receiving and retaining wheel assembly 2. Thereafter, wheel assembly 2 may be dollied as desired on caster assemblies 28, 30, 32, and 34.

Considering apparatus 1 in more detail, as shown in FIG. 1, framework body section 12 is a telescoping, linear piece including a first, linear member 36, and a second, linear member 38. As seen, first body section member 36 and second body section member 38 are axially aligned and dimensioned so that a first end 40 (not seen) of member 38 may be received in first end 42 of member 36, and member 38 readily slidable within member 36. In preferred form, the fit between member 36 and 38 is sufficiently snug to avoid axial misalignment of members 36 and 38 that would cause binding, but sufficiently free to permit smooth telescoping action of body section 12. As will be appreciated by those skilled in the art, a suitable lubricant such as conventional wheel bearing grease in the case of steel construction may be provided on the mating surfaces of members 36 and 38 to assure ease of movement.

While the cross section of members 36 and 38 may be any compatible form, it is preferred they both be rectangular; e.g., square, so as to provide mating corners to discourage axial rotation of members 36 and 38 relative to one another.

Continuing with reference to FIG. 1, second end 44 of second body section member 38 is seen to be attached to an anchor point 46 on arm member 16. As shown, the attachment may, for the sake of appearance, be made by a coupling 48 having a cross section corresponding to member 38, in which end 44 is axially received and fixed; coupling 48, itself being fixed to anchor point 46. The fixation of end 44 to coupling 48 and coupling 48 to anchor point 46 may be accomplished in any convenient manner; as for example, by welding where steel construction is elected.

As in the case of the attachment of second body member 38 to arm 16, a second end 50 of first body section member 36 is attached to an anchor point 52 on arm member 14. However, in the instance of member 36, a coupling need not be used, and end 50 may be directly fixed to point 52, again; as for example, by welding for steel construction.

As seen in FIG. 1, framework arm members 14 and 16 are substantially the same. Each includes linear arm sections, 54, 56 respectively; first stepped end sections 58, 60 proximate body section anchor points 52 and 46; and second stepped end sections 62, 64 distant from anchor points 52 and 46, respectively. Further, each of the end sections 58, 60, 62 and 64 is seen to include tab pieces 66, 68, 70 and 72 attached to platform elements 74, 76, 78, 80 for mounting arm members 14 and 16, and with them, framework 10 to caster assemblies 28, 30, 32, 34. Each of end sections 58, 60, 62 and 64 is also seen to include angled coupling spans 82, 84, 86, and 88 for connecting arm sections 54 and 60 to tabs 66, 68, 70 and 72, respectively.

As with be appreciated by those skilled in the art, the larger the diameter of the caster assemblies, the more easily apparatus 1 may be moved when carrying a load. However, since framework 10 and roller assemblies 22, 24 are mounted on caster assemblies 28, 30, 32 and 34, the larger the diameter of the caster assemblies the further from the ground, and, accordingly, due to the radius of curvature of tire 4, the further from the center line of wheel assembly 2 roller assemblies 22, 24 would be positioned.

As explained more fully in my U.S. Pat. No. 4,690,605, the contents of which are incorporated herein by reference, the closer the roller assemblies can be located to the wheel assembly center line, and ground; i.e., the smaller the radius of the roller assemblies; the greater is the mechanical advantage of an apparatus of the type described here.

Therefore, in accordance with this invention, in order to allow for use of large diameter caster assemblies 28, 30, 32, and 34 to achieve ease of movement, and at the same time locate roller assemblies 22 and 24 as close to the vertical center line of wheel assembly 2 and ground as possible, to maximize mechanical advantage, arm members 14 and 16, in preferred form, are provided with stepped ends 58, 60, 62 and 64.

According, and as best seen in FIG. 5, the angle and length of each of the coupling spans is selected so that roller assemblies 22 and 24 may be mounted as close to the ground and the wheel assembly vertical center line as conveniently possible and yet have sufficient ground clearance "c" to permit freedom of movement.

Continuing with reference to FIG. 1, as seen, arm members 14 and 16 are oriented relative to linear body section 12 so as to extend substantially parallel to one another and orthogonally to the coaxial center lines of body section members 36 and 38, and, thereby, provide framework 10 with its generally "U" shaped form.

Linear sections 54 and 56 of arm members 14 and 16 respectively may, in preferred form, each be embodied in two detachable parts joined by a coupling 15 and 17, respectively, as illustrated in connection with arm 16 in FIG. 2. Arm member 14 and 16 are formed with detachable parts to facilitate removal of outboard casters assemblies 28 and 34 so that roller assemblies 22 and 24 mounted on arms 14 and 16 may be removed for repair or replacement. As will be appreciated by those skilled in the art, the couplings may be of any convenient type; for example a transversely bolted, overlapping butt joint, as shown in FIG. 2, or the like.

Arm members 14 and 16 may be made in any convenient form, and preferably are flat stock where steel construction is elected. Further, stepped arm ends 58, 60, 62 and 64 may also be formed in any convenient fashions; for example, bending a continuous section, or welding individual pieces as in the case of steel construction.

Still with reference to FIG. 1, as shown, wheel assembly engaging elements 18 and 20 are preferably embodied as roller assemblies 22 and 24 mounted, respectively, to framework arm members 14 and 16 so as to define a wheel assembly engaging means. Each of the roller assemblies 22, 24 is formed by a cylindrical roller element 90, 92, coaxially and rotatably mounted on framework arm members 14 and 16, respectively. In preferred form, roller elements 90 and 92 are mounted on bushings 91, 93, 95, and 97, respectively, as illustrated in connection with element 92 in FIG. 2, fixed to linear sections 54 and 56 of the arm members. The bushings are preferably each formed by a short length of cylindrical tubing coaxially mounted on the respective arm member. Each bushing is provided with an outside diameter slightly smaller than the inside diameter of its respective roller element so as to permit, relative movement. Further, the inside diameter of the bushings is selected to approximate the width of arm section 54, 56 to which the bushings may be fixed in any convenient fashion; for example, welding in the case of steel construction. Additionally, and as will be appreciated by those skilled in the art, suitable lubrication may be provided between the mating surfaces of the roller elements and their respective bushings. In preferred form, two the bushings are provided for each roller, respectively located proximate the axial ends of roller elements 90 and 92; as for example adjacent anchor points 52 and 46 and angled spans 86 and 88.

As will be appreciated, while I have show roller assemblies mounted on each of the framework arm member, it would be adequate if a roller assembly were mounted only on one arm, the other arm being arranged to simply engage tire 4 as a stop. As will also be appreciated, that while for simplicity, the preferred form of the roller assembly is a roller element in the form of a cylindrical sleeve axially and rotatably mounted to the framework arm member, other forms of roller assemblies could also be used.

As noted, arm members 14 and 16 may be disassembled to permit removal of roller elements 90 and 92. Of roller elements 90 and 92 permit repair where the elements are worn or damaged, or where replacement with elements of different radius is desired to effect adjustment of mechanical advantage consistent with the teachings of my above referenced patent.

The transport means as noted, is, in preferred form, comprised of caster assemblies 28, 30, 32 and 34 mounted to framework 10. As seen in FIG. 1, the caster assemblies are the same, and the principal elements of each may be understood with reference to assembly 28. More particularly, assembly 28 includes a frame 94 mounted by a swivel 96 to platform 78 for rotation about the frame vertical axis. Additionally, assembly 28 includes a wheel 98 mounted on an axle 100 located in frame 94 radially displaced from the frame vertical axis. In preferred form, in order to improve maneuverability, radial displacement is minimized so the caster assemblies may execute small radius turns. Accordingly, when apparatus 1 is urged in a particular direction, wheel 98 may readily orient in that direction to facilitate movement.

In preferred form, swivel 96 is provided with ball bearings and wheel axle 100 with roller bearings to assure smooth movement under heavy loading; as for example where an affixed wheel assembly is received at framework 10. Additionally wheel 98 may be made of material having adequate strength and durability to assure integrity; for example, steel of synthetics such as nylon.

As discussed in my referenced patent, the mechanical advantage of an apparatus such as described here is determined both by the mechanical advantage of the roller assemblies and the mechanical advantage of the apparatus actuator. Regarding the contribution by the apparatus roller assemblies, it can be shown that apparatus mechanical advantage is dependent on the radius of the roller elements; the smaller the radius, the larger the contribution to mechanical advantage.

However, lift is also affected by the roller element radius, and, unfortunately, conversely; i.e. the smaller the roller element radius, the less the lift.

As a result, there are limits to the extent to which roller element radius can be reduced to achieve increased mechanical advantage, and still have adequate lift.

Therefore where it is necessary to increase mechanical advantage to smooth and simplify operation, it would be advisable to consider the elements of the apparatus actuator.

As pointed out above, while actuators have been proposed to provide adequate mechanical advantage to permit jacking an affixed vehicle wheel assembly; e.g. U.S. Pat. No. 2,362,981 and 3,954,198, the designs proposed have been complex and costly to construct.

In accordance with this invention the apparatus here proposed, however, provides improved mechanical advantage, while at the same time, featuring a simple and compact mechanical design that is convenient to operate and inexpensive to construct.

Figure 3:
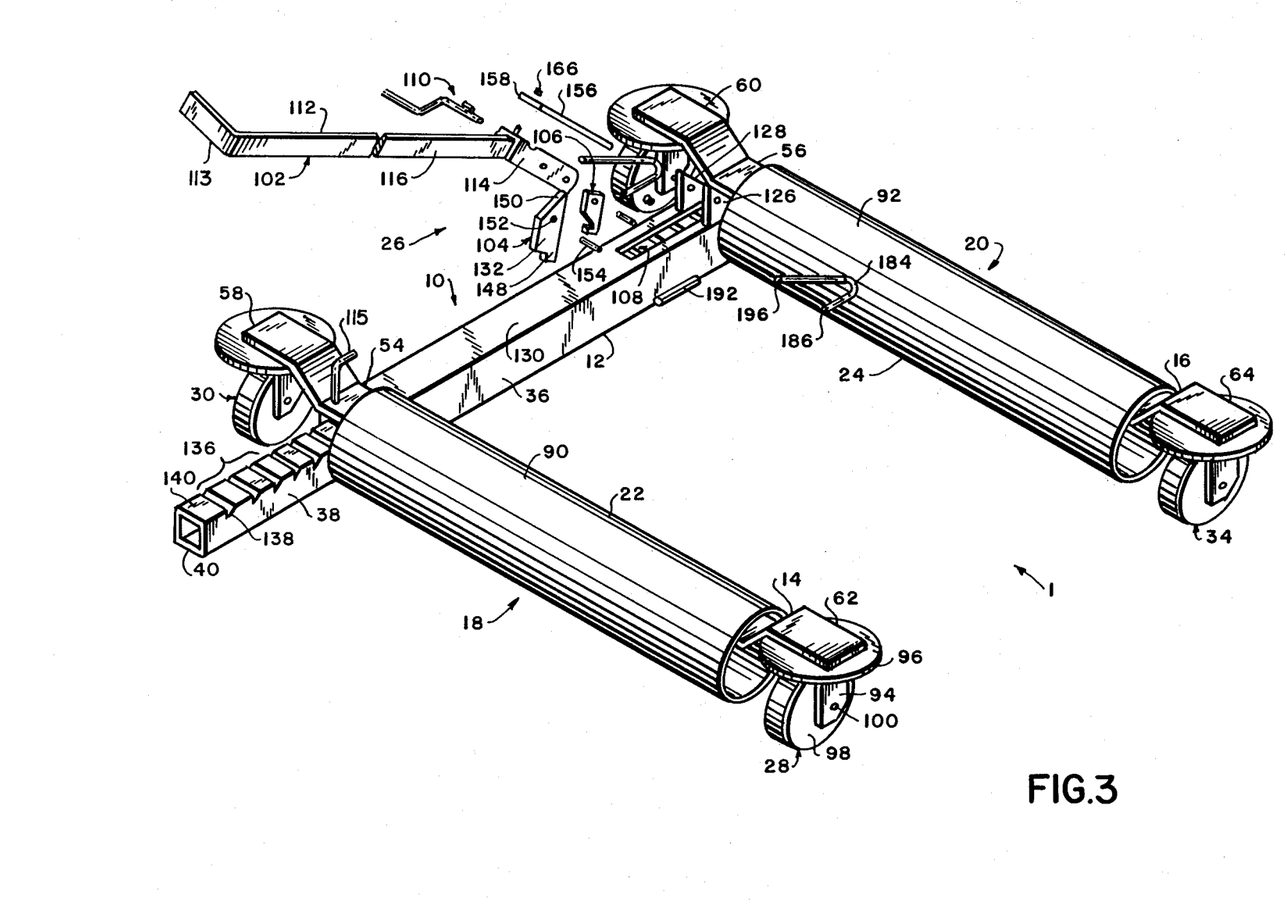
FIG. 3 is on a particularly exploded perspective view of a preferred embodiment of the apparatus showing the elements of the actuator in accordance with this invention.
Figure 3A:
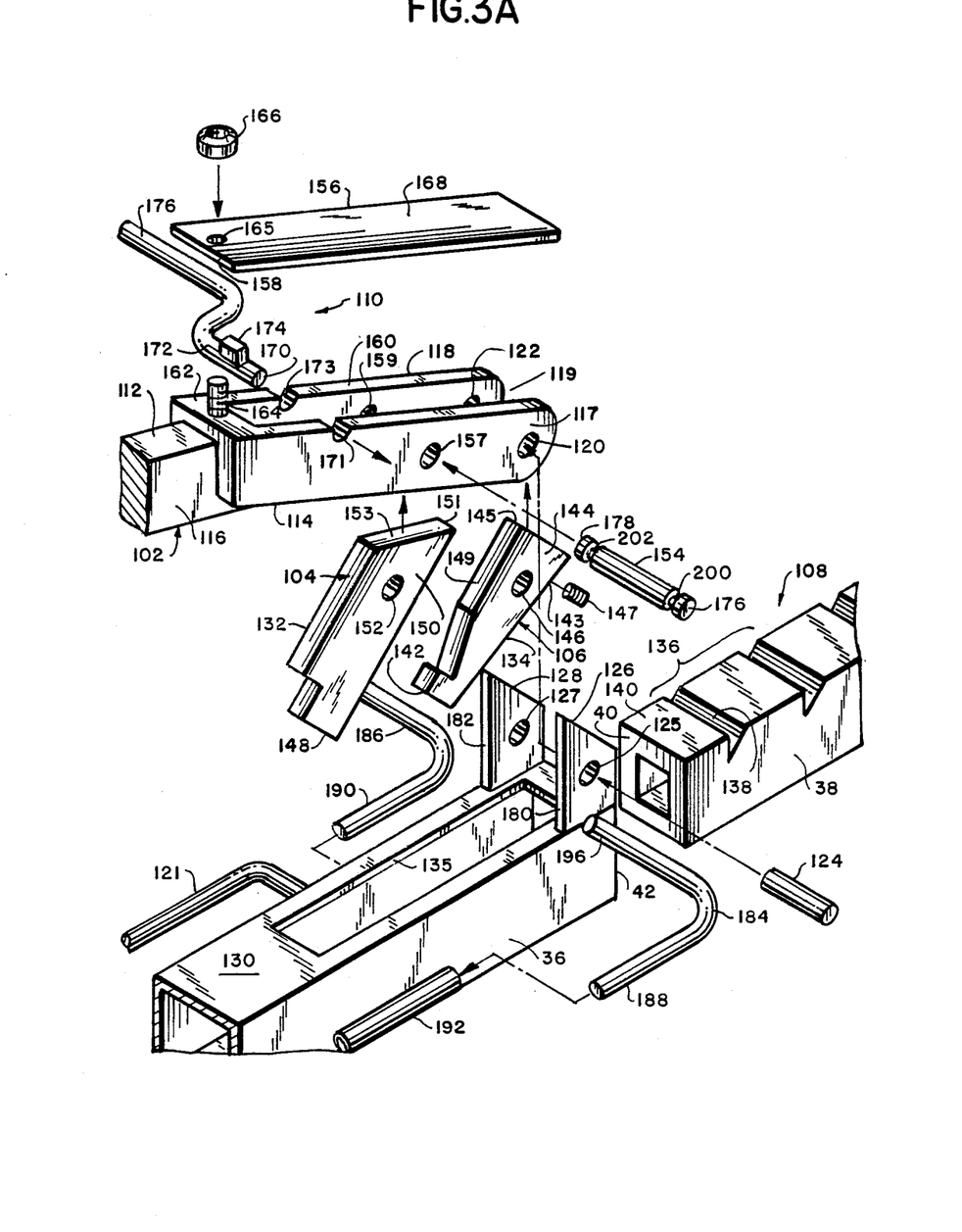
FIG. 3A is an exploded perspective view of the actuator of the apparatus in accordance with the a preferred embodiment of this invention.

Actuator 26 in accordance with this invention is best seen in FIGS. 3 and 3A. As shown in FIG. 3, actuator 26 is preferably foot operated and includes a double pawl, bi-directional, lever ratchet mechanism having a lever means 102 pivotally mounted to first body section member 36, a drive member 104 and brace member 106 mounted at lever means 102, and means 108 for receiving the drive and brace members provided at second body member 38. Additionally actuator 26 includes means 110 for controlling the direction of actuator 26, the direction control means 110 having a first setting to enable actuator 26 to cause apparatus 1 to lift wheel assembly 2, and a second setting to enable actuator 26 to lower a wheel assembly 2 held at some height by apparatus 1.

In operation, and when configured for lifting, i.e. control means 110 in the first setting, operation of lever means 102 from its initial position causes drive member 104 to engage receiving means 108 and draw second body section member 38 within first body section member 36 a predetermined distance, until brace member 106 can engage receiving means 108 to brace second member 36 against separation from first member 36 as drive member 104 is withdrawn from receiving means 108 and reset to its initial position with lever means 102. When repeated, this action allows roller assemblies 22 and 24 to be successively driven against tire 4 to lift wheel assembly 2 in predetermined increments.

When direction control means 110 is disposed in its second setting, actuator 26 is configured to lower a raised wheel assembly 2, and operation of lever means 102 causes drive member 104 to engage receiving means 108 to enable brace member 106 to be withdrawn from receiving means 108, so that under the control of lever means 102, wheel assembly 2 can cause second body section member 38 to be axially separated from first body section member 36. The consequence of this action is that with successive operation of lever means 102; i.e., stroke and reset, wheel assembly 2 may be lowered in predetermined increments.

As seen in FIG. 2, apparatus 1 is configured for wheel assembly transport or storage. As shown, actuator 26 is seen to include a restraint 115 for holding lever means 102 proximate the upper surface of body member 36 so as to give actuator 26 a compact form which will not encumber movement when either a wheel assembly is retained at roller assemblies 22, 24 for dollying, or when apparatus is not in use. In preferred form, restraint 115 includes a finger extending vertically from arm member 14 which may be swivel mounted so as to catch lever means 102 when means 102 is fully depressed, or be free of lever means 102 when the actuator 26 is operated. As will be appreciated, other suitable means could also be used.

Considering actuator 26 in more detail, and with reference to FIG. 3A, lever means 102 is seen to include a lever element 112 having a bifurcated lowering housing portion 114, a shank portion 116 and a pedal end 113 (not seen).

Housing portion 114 has a first arm 117, a second arm 118 and a slot 119 therebetween which is dimensioned to receive drive member 104 and brace member 106. Continuing, lower axial ends of arms 117 and 118 are provided with holes 120 and 122, respectively, for rotatably receiving a pin 124 which is pressed into through holes 125 and 127 in ears 126 and 128, respectively, which project from the upper surface 130 of member 36. These elements, in combination, form a pivot for pivotally mounting lever element 102 to upper surface 130 of member 36 at its first end 42.

Continuing, in preferred form, drive member 104 is a first pawl 132, brace member 106 a second pawl 134, and receiving means 108 a rack 136. As seen, rack 136 is formed by a plurality of axially extending ramped notches 138 having a fixed pitch and formed transversely on upper surface 140 of second body section member 38.

As seen in FIG. 3A, second pawl 134 is a generally bar shaped piece of patterned profile having a contoured brace end 142 for engaging notches 138 of rack 136. Further pawl 134 is provided with a contoured control end 144. Control end 144, in preferred form, includes a tapered control projection 145 and a control shoulder 149. Still further, brace pawl 134 is provided with a mounting hole 146 located centrally of its body to permit pawl 134 to be rotationally mounted on pivot shaft 124 of lever element 11.

Yet additionally, a bias spring 147 is received in a bore 143 provided at the lower side of pawl 134 located length-wise on pawl 134 between mounting hole 146 and pawl control end 144. Spring 147 biases pawl brace end 142 against rack 136. As will be appreciated, other convenient biasing means could also be used; for example, a circular spring at shaft 124.

Like pawl 134, drive pawl 132 is seen in FIG. 3 to also to be a generally bar shaped piece of patterned profile having a contoured drive end 148 for engaging notches 138 of rack 136. Additionally, pawl 132 includes a contoured control end 150. As in the case of pawl 134, pawl 132 has a tapered control projection 151 and a control shoulder 153. Finally, drive pawl 132 is provided with a mounting hole 152 located centrally of its body to receive a pin 154 for rotationally mounting pawl 132 at a point axially displaced from lever element pivot 124 on lever housing portion 114. Pin 154 is seen to be received at housing arms 117 and 118 through holes 157 and 159 respectively. As in the case of pawl 134, pawl 132 may be biased toward rack 136 by a spring member; for example, a circular spring at pin 154. A window 135 having a generally rectangular shape is provided in upper face 130 of body member 36, proximate end 42, to permit ends 148 and 142 of drive pawl 132 and brace pawl 134, respectively, to engage notches 138 of rack 136.

As shown in FIG. 3A, lever means 102 also includes elements for establishing an initial operating position for lever 112. Particularly, lever means 102 includes a stop 175, best seen in FIG. 5, formed by ends 176, 178 of drive pawl mounting pin 154 and edges 180, 182 of lever mounting ears 126 and 128, respectively. Ends 176 and 178 of pin 154 are dimensioned to extend beyond the sides of lever housing portion 114 to abut ears 126 and 128 respectively.

Further, biasing means are provided which urge pin 154, and with it, lever element 112 against ear edges 180, 182. As best seen in FIG. 3A, the biasing means, in preferred form, comprises curved spring elements 184, and 186, each having first ends 188 and 190, respectively, received in retainers 192 and 194, respectively, horizontally mounted on the inboard and outboard sider of body section member 36.

Spring elements 184 and 186 are also provided with second ends 196, 198, respectively, received in groves 200, 202 provided at ends 176, 178 of pin 154. As will be appreciated, other suitable biasing arrangements could be used; for example, a circular spring located at pin 124 or the like.

With this arrangement, spring elements 184, 186 bias pin 154, and with it, lever element 112 against ears 126, 128. Accordingly, lever element 112 is spring loaded, with the effect that when lever 112 is rotated about its pivot pin 124 by; for example, stepping on lever pedal end 113, spring elements 184, and 186 are compressed. As a result, when force is reduced on lever pedal end 113 below the restoring force of springs 184, 186, lever element 112 is returned to the initial position defined by stop 175; i.e. pin 154 against ears 126, 128.

Still with reference to FIG. 3A, actuator 26, as noted, also includes means 110 for controlling actuator direction. As seen, means 110 includes a resilient element, which in preferred form, comprises a spring plate 156 fix mounted at one end to the upper face 160 of lever housing portion 114. Particularly, plate 156 is a generally rectangular piece having end 158 fixed to base section 162 of housing 114 by means of a stud 164 and nut 166. Stud 164 extends substantially orthogonally from section 162 through a hole 165 provided in plate 156. Nut 166 secures plate 156 to face 160. As will be appreciated, other conventional anchoring means could also be used.

By mounting plate 156 with end 158 fixed, plate body portion 168 is made to removably overlay slot 119, so as to engage ends 144 and 150 of brace pawl 134 and drive pawl 132, respectively.

Continuing, direction control means 110 also includes a deflection element for deflecting body portion 168 from housing face 160 and pawls 132, 134. In the preferred form shown, the deflection element comprises a crank 170 having a shaft 172 on which an eccentric; for example, a cam 174 is provided. Additionally, crank 170 includes a web and pin section 176 to facilitate manual angular movement of shaft 172 and cam 174.

As seen, crank 170 is journaled in housing portion 114 of lever element 112 transversely of slot 119 so that cam 174 can engage body portion 168 of spring plate 156. Accordingly crank 170 may be set in a first position in which cam 174 deflects spring plate body 168 from end 144 of brace pawl 134. Further, in this first position, cam 174 orients plate 156 to establish a stop for end 150 of pawl 132, thereby defining a first, or lifting orientation for pawl 132 relative to rack 136. Additionally, crank 170 may be set in a second position in which cam 174 permits spring plate 168 to bear against end 144 of brace pawl 134 to counteract bias spring 127, and permit brace end 142 of pawl 134 to disengage rack 136. Still further, in this second position cam 174 orients plate 156 to again act as a stop for end 150 of pawl 132, thereby defining a second, or lowering, orientation for pawl 132 relative to rack 136.

With this arrangement, the first position setting of direction control means 110; i.e. crank 170, configures the actuator for lifting, while the second position setting of means 110; i.e., crank 170, configures the actuator for lowering.

As with the other elements of apparatus 1, any suitable material may be used for the actuator; for example, steel or high-strength plastics. As will be appreciated, special treatments such as hardening in the case of steel construction, may be applied to the load bearing elements and surfaces; e.g., pawls, rack, spring plate, etc.

The operation of actuator 26 may best be understood with reference to FIGS. 6A to 6D and 7A to 7D, where the relationship of the actuator elements is shown at various points in the lifting and lowering process.

For the sequence of views given in FIGS. 6A to 6D, it is presumed roller assemblies 22 and 24 have been brought against tire 4 of wheel assembly 2, and that the actuator is ready to initiate lift.

Figure 6A:
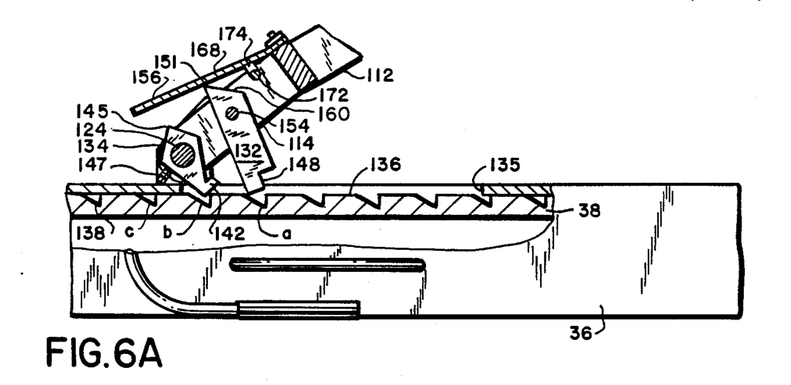
FIGS. 6A to 6D are a sequence of fragmented side views, partially in section, of the apparatus in accordance-with a preferred embodiment of the invention showing the actuator mechanism at various stages during lifting.

In FIG. 6A, the actuator elements are depicted partially in section, to aid understanding. As shown, shaft 172 and cam 174 of direction control means 110 are set in a first position, particularly, with the peak of cam 174 oriented substantially orthogonally to surface 160, so as to deflect body 168 of plate 156 from upper face 160 of lever housing portion 114. Additionally, lever element 112 is disposed in its initial position; that is, biased against stop 175 formed by ears 126, 128 and pin 154.

In this configuration, brace pawl 134 is free of plate 156 and able to rotate clockwise about pin 124 so that brace pawl end 142 extends through window 135 in member 36 and engages notch "b" of rack 136. In this position, brace pawl 134 prevents second body member 38 from being withdrawn from first body member 36. As will be appreciated, while pawl 134 trends to rotate under its own weight about pin 124, to assure rotation and positive engagement, pawl 134 is biased against surface 140 of member 38 by spring 147.

In the above described configuration, however, the rotation of drive pawl 132 is restricted. Particularly, pawl control projection 151 is spaced from plate 156 such that plate body portion 168 acts as a stop which restricts clockwise rotation, thereby defining a first, or lifting, position for pawl 132. As noted, pawl 132, in preferred form may be biased to assure rotation. In this position, pawl end 148 is oriented so as to extend through window 135 aligned to engage notch "a", the notch next closest to notch "b", the notch in which brace pawl 134 is engaged.

Figure 6B:
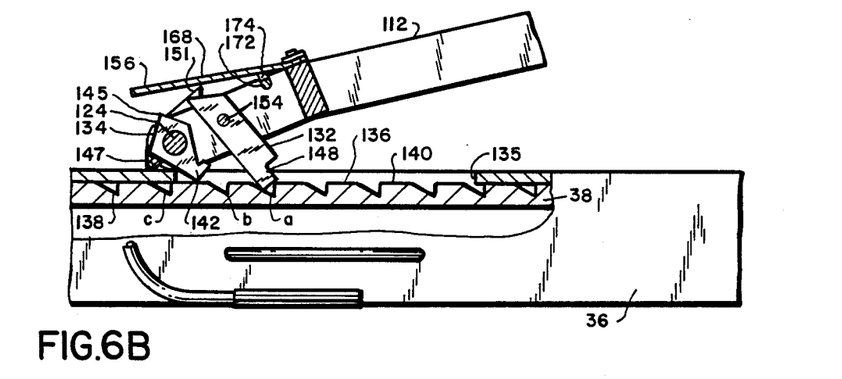

Continuing, as shown in FIG. 6B, as lever 112 is forced toward body section members 36 and 38; as for example by stepping on lever pedal end 113 (not seen), end 148 of drive pawl 132 will engage notch "a" to drive rack 136, and with it member 38 into member 36. This causes roller assemblies 22 and 24 to drive against tire 4 of wheel 2, producing lift in the manner previously described. Additionally, and as shown, axial movement of member 38 into member 36 pushes end 142 of pawl 132 out of notch "b", and onto surface 140.

As seen in FIG. 6B, the force applied to member 38 arise by leveraging pawl 132 against rack 136 from a fulcrum established on member 36 at lever pivot pin 124.

Figure 6C:
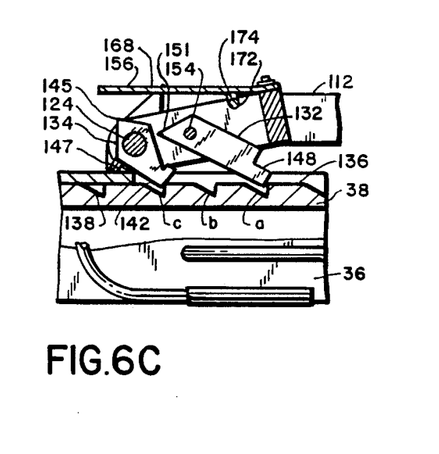

As shown in FIG. 6C, at the end of the lever stroke, that is, the maximum axial reach of drive pawl 132 relative to rack 136 with level element 112 fully depressed, end 142 of pawl 134 has been caused by bias spring 147 to drop into notch "c".

Figure 6D:
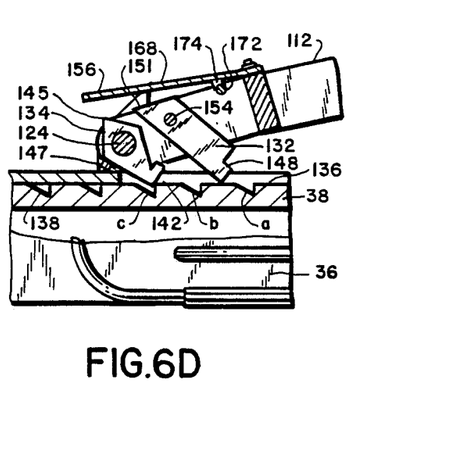

Now, as drive pawl 132 is withdrawn in response to lever element 112 being returned to its initial position by restoring springs 184, 186, end 142 of pawl 134 braces rack 136, and with it, member 38, against axial separation from member 36 under the load of wheel assembly 2 held at roller assemblies 22, 24, as best seen in FIG. 6D. And, actuator 26 can again assume the configuration shown in FIG. 6A.

As will be appreciated, with repeated strokes of lever 112 as described, member 38 can be successively driven axially into member 36 in increments of distance determined by the pitch of rack 136, that is, the distance between successive notches 138, this distance being selected to be consistent with the maximum axial reach of drive pawl 32 described above.

Continuing, for the sequence of views given in FIGS. 7A to 7D, it is presumed the apparatus has lifted a wheel assembly 2, that the wheel assembly is being held at some height by roller assemblies 22, 24, and that the actuator is ready to initiate lowering.

Figure 7A:
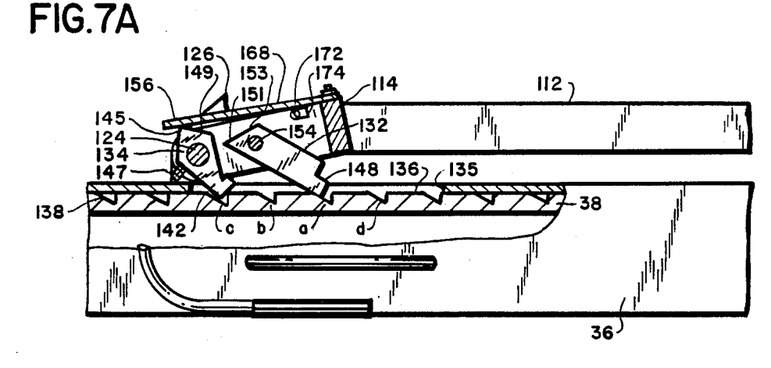
FIGS. 7A to 7D are a sequence of fragmented side views, partially in section, of the apparatus in accordance with a preferred embodiment of the invention showing the actuator mechanism at various stages during lowering.

As shown in FIG. 7A, shaft 172 and cam 174 of direction control means 110 are now set in a second position, particularly, rotated 90 degrees from the first position noted in connection with FIG. 6A, so as not to deflect body 168 of plate 156 from upper face 160 of housing 114. Additionally, instead of lever element 112 being disposed in its initial position; that is, biased against stop 175, it is disposed almost fully depressed.

In this configuration, body portion 168 of plate 156 falls upon control projection 145 of pawl 134. However, because the weight of wheel assembly 2 supported at roller assemblies 22, 24 seeks to drive body members 36 and 38 apart, notch "c" of rack 136 is driven against pawl 134 at end 142, holding it in place.

Figure 7B:
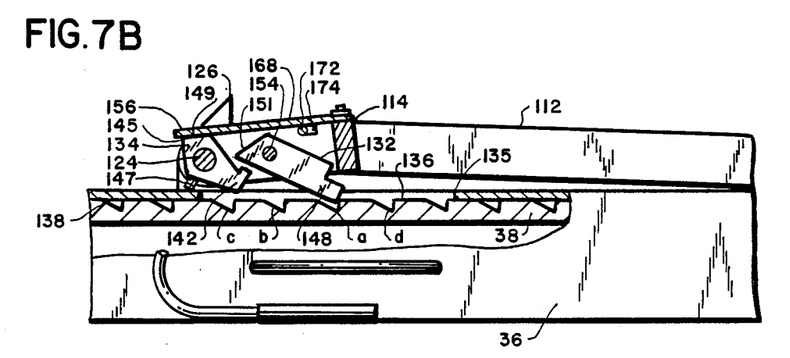

Accordingly, as lever 112 is further depressed, end 148 of drive pawl 132 engages notch "a", drives it slightly, and assumes the load of wheel assembly 2. The result of this is that brace pawl 134 is released and caused to rotate out of notch "c" under the action of plate 156, plate 156 functioning to counteract spring 147, as best seen in FIG. 7B. This rotation continues until control shoulder 149 comes to rest on plate body portion 168.

Figure 7C:
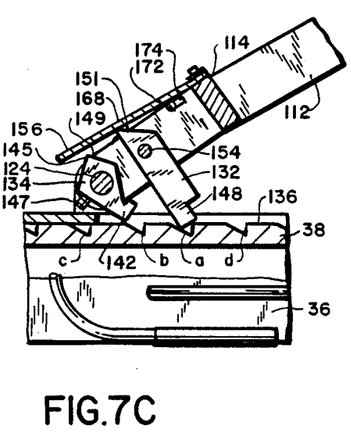

Thereafter, controlled return of lever 112; for example by use of a foot at lever pedal end 113 to restrain lever 112, permits rack 136 and member 38 to axially separate from member 36, as shown in FIG. 7C. As will be appreciated, the force applied to member 38 to control separation arises by leveraging pawl 132 against rack 136 from a fulcrum established on member 36 at lever pivot pin 124 as described above in connection with lifting.

However, as also seen in FIG. 7C, as lever 112 returns to the position defined by stop 175, pawl 132 is caused to rotate clockwise, causing projection 151 of control end 150 to engage body portion 168 of plate 156 so as to lift plate 156 from pawl 134, and again permit spring 147 to bias pawl brace end 142 against face 140 of rack 136.

Figure 7D:
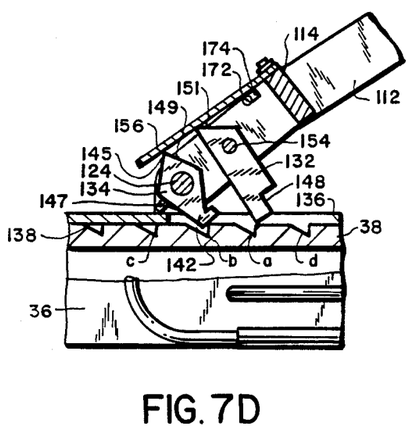

Accordingly, when lever 112 is returned to a point just preceding stop 175, pawl 132 under the action of spring 147 is able to engage notch "b" of rack 136 to again assume the load of wheel assembly 2 and brace body member 36 and 38 against further separation. Thereafter, continued return of lever 112 to stop 175 releases drive pawl 132 from notch "a" and permits it to be oriented in a second, or lowering, position as compared with the first, or lifting, position shown in FIG. 6A, this second position being defined by the spacing of plate 156 from pawl 132, plate 156 having come to rest on pawl 134, as best seen in FIG. 7D.

In this second position, drive pawl 132 is again aligned to engage rack 136 when lever 112 is depressed; however, now at notch "d", one notch beyond "a".

Therefore, and as will be appreciated, with repeated strokes of lever 112 as described, and under the influence of the weight of wheel assembly 2 at roller assemblies 22, 24, member 38 can be successively axially withdrawn from member 36 in increments of distance determined by the pitch of rack 136, where the increment distance, as noted with respect to lifting, is consist with the maximum axial reach of drive pawl 132.

As will also be appreciated by those skilled in the art, in accordance with known mechanical design principals, the mechanical advantage of actuator 26 is a function of and may be adjusted by adjusting the length of lever element 112; the point of location of drive pawl 132 on lever 112; and the angular distance for the sweep of the lever stoke.

This invention also includes an improved method for jacking and dollying a wheel assembly while it remains affixed to the vehicle. In preferred form, the method includes the steps of first locating a plurality of wheel assembly engaging elements, at least one of which is a roller assembly, at the tire tread face of a wheel assembly to be lifted at points on different sides of the wheel assembly vertical center line as shown in FIG. 5 and, thereafter, coupling the wheel engaging elements with coupling member oriented in a plane substantially perpendicular to the tread face.

More particularly, the plurality of wheel engaging elements may be comprised of two cylindrical sleeves, each rotatably mounted on an arm of a "U" shaped framework such that the cylindrical axis of each sleeve is substantially perpendicular to the tire tread face of a wheel assembly that has been located between the arms for lifting. Further, the arms of the framework may be coupled by a contractible; e.g., telescoping, body section that is oriented with its length axis substantially perpendicularly to cylindrical axis of the sleeves. Additionally, the body section may be located proximate the side wall of the tire, in a plane substantially perpendicular to the tire tread face. In this arrangement, the telescoping members of the body section respectively comprise the above referred to members for coupling the wheel engaging elements.

Thereafter, the method requires driving the coupling member relative to; i.e., towards, one another by leveraging for a predetermined distance the coupling member of one wheel assembly engaging element from a fulcrum on the coupling member of another wheel assembly engaging element. Following leveraging for a predetermined distance, the method calls for one coupling member to be locked against separation from another coupling member by bracing one coupling member against another.

Particularly, the leveraging, driving and bracing steps of the method may be carried out by deploying a double pawl, lever actuated ratchet on the above described framework body section such that the ratchet lever, together with a drive pawl and brace pawl are pivotally mounted on one body section member for engaging a rack axially disposed on the other body section member of the framework. Thereafter, the steps for lifting would as described in connection with FIGS. 6A to 6D above.

Next, the method calls for repeatedly and alternately driving one coupling member relative to, i.e., towards, another and bracing one coupling member against another by repeatedly resetting and releveraging so as to successively drive the wheel assembly engaging elements against the tire tread to lift the wheel assembly and retain it at a desired height.

As will be appreciated, the described steps for successively driving the engaging elements against the tire tread may be accomplished by applying multiple, successive strokes to the above referenced double pawl, lever ratchet disposed at the framework body section.

Finally, the method calls for the raised wheel assembly and wheel engaging means which support the wheel assembly to be transported as desired. More particularly, this may be accomplished by wheeling the described framework where desired by means of caster assemblies upon which the framework may be mounted.

The method of this invention also contemplates preferred steps for lowering a wheel assembly that has been lifted. Particularly, the wheel assembly may be lowered from the raised position by first releasing the described bracing between one coupling member and another, and permitting one coupling member to be withdrawn relative to another a predetermined distance by the weight of the wheel assembly until one coupling member is again braced against another. Thereafter, the method calls for repeatedly and alternately releasing and resetting the bracing to successively and controllably permit the wheel assembly to repulse the wheel assembly engaging elements until the wheel assembly is lowered a desired amount.

More particularly, the preferred steps for lowering the wheel assembly would include using a double pawl ratchet which has been rendered bi-directional by inclusion with a direction control means as described in connection with actuator 26 of this invention, and, thereafter, performing the steps for lowering described in connection with FIGS. 7A to 7D above.

Finally, and as will be appreciated by those skilled in the art, the method here described can be performed either by manual or pedal operation of the leveraging elements. However, pedal operation is preferred because the force required for leveraging can be more easily and comfortably applied by foot.

While this invention has been described in its preferred forms, it will be appreciated that changes may be made in form, construction, procedure and arrangement of its various elements and steps without departing form its spirit or scope.

I claim:

1. Apparatus for jacking and dollying a vehicle wheel assembly, the wheel assembly including a tire, wheel and axle, the apparatus comprising: structural means for forming an apparatus framework, the structural means including a body section having a first body member and a second body member, wherein the first and second body members are movable relative to one another, and wherein the structural means also includes a first arm member and a second arm member, the first arm member being connected to the body section first member and the second member being connected to the body section second arm member;

transport means for enabling movement of the apparatus;

engaging means for interacting with the wheel assembly, the engaging means, including at least a first roller assembly connected to one of the arm members; and actuator means for driving the engaging means against the wheel assembly to lift the wheel assembly and form the framework into a carriage for receiving the wheel assembly, the actuator means including a lever means, a drive member, a brace member and means for receiving the drive member and brace member, the actuator means being mounted on the body section such that the lever means, drive member and brace member are connected to one body section member, and the lever means is coupled to the drive member and brace member, and the means for receiving the drive member and brace member is connected to the other body section member, so that when the lever means is operated a portion of one body section member is driven towards a portion of the other a predetermined distance and thereafter, braced against separation from the other, so that the engaging means may be successively driven against the tire on different sides of the wheel assembly centerline to lift the wheel assemble with repeated resetting and actuation of the lever means.

2. The apparatus of claim 1 wherein the actuator means includes direction control means for controlling operation of the actuator means such that when the direction control means is disposed in a first setting, the actuator means may be repeatedly operated to lift the wheel assembly to a desired height, and so that when the control means is disposed in a second setting, the actuator means may be repeatedly operated to lower the wheel assembly from a height.

3. The apparatus of claim 2 wherein the lever means includes a lever element pivotally mounted to the first body member, the drive member includes a first pawl rotatably mounted to the lever element, the brace member includes a second pawl rotatably mounted to the lever element, and wherein the means for engaging the drive member and brace member includes a rack provided at the second body member aligned with the first and second pawls; and wherein the lever element has a first end pivotally mounted to the first body member, and a second end at which an actuating force may be applied, the second pawl is mounted proximate the lever element first end, and the first pawl is mounted on the lever element between the lever element first and second ends displaced from the second pawl so that when the lever means is operated with the direction control means disposed in the first setting, the first pawl engages the rack and advances the second body member a predetermined distance towards the first body member, whereupon the second pawl is caused to engage the rack to brace the second body member against separation form the first body member when the wheel assembly is engaged, so that the lever means may be reset.

4. The apparatus of claim 3 wherein the direction control means includes a resilient element and a deflection member arranged relative to the first and second pawls so that when the deflection member is in a first position corresponding to the first setting of the direction control means, the resilient element does not bias the second pawl, and so that when the deflection member is in a second position corresponding to the second setting of the direction control means, the resilient element biases the second pawl such that when the actuator lever means causes the first pawl to engage the rack while a wheel assembly is received at the wheel engaging means, the resilient element causes the second pawl to disengage the rack, enabling the first and second body section members to be separated a predetermined distance, and wherein as the first and second body members separate, the first pawl deflects the resilient element so that the second pawl may again engage the rack and brace the first and second body members against further separation, thereby releasing the first pawl from the rack.

5. The apparatus of claim 4 wherein the first pawl has a first end for engaging the rack and a second end for engaging the direction control means, the first pawl being rotatably mounted at the lever element pivot at a point between the first pawl first and second ends, and wherein the second pawl has a first end for engaging the rack and a second end for engaging the direction control means, the second pawl being rotatably mounted at a point between the second pawl first and second ends.

6. The apparatus of claim 5 wherein the resilient element of the direction control means includes a plate having a first end mounted to the actuator lever element and a plate body portion free to engage the first and second pawl, and wherein the deflection member includes a cam for deflecting the plate.

7. The apparatus of claim 3 wherein the lever means includes restoring means for returning the lever element to a first position following lever means operation.

8. The apparatus of claim 7 wherein the lever means also includes a stop, and the restoring means includes a spring element for biasing the lever element against the stop to establish the first lever element position.

9. The apparatus of claim 3 wherein the body section second member has a first end axially received in a first end of the first body section member, and wherein the actuator lever element is pivotally mounted proximate the first end of the first body member, the first body member further including an opening proximate the first end thereof through which the first and second pawl extend to engage the rack, the rack being formed on the second body member as a linear array of notches extending axially along the second body member.

10. The apparatus of claim 9 wherein the lever element is provided with a pedal so that the lever means may be operated by foot.

11. Apparatus for jacking and dollying a vehicle wheel assembly including a tire, wheel and axle, the apparatus comprising:
   a framework including a body section having a first body member and a second body member, the first body member having a first end in which a first end of the second body member is slidably received, and wherein the framework also includes a first arm member connected substantially orthogonally to the first body member at a second end of the first body member and a second arm member connected substantially orthogonally to the second body member at a second end of the second body member, the second arm member extending in a direction substantially parallel to the first arm member;
   transport means for enabling movement of the apparatus;
   roller means for engaging the wheel assembly, the roller means including at least a first roller assembly mounted upon one of the framework arm members; and
   actuator means for driving the roller means against the wheel assembly to lift the wheel assembly and form the framework into a carriage for receiving the wheel assembly, the actuator means including a lever element, a first pawl, a second pawl and a rack, wherein the lever element has a first end mounted to the first body member, and a second end st which an actuating force may be applied, the second pawl is rotatably mounted to the lever element, and the first pawl is rotatably mounted to the lever element between the lever element first and second ends and displaced from the first pawl, and the rack is connected to the second body member such that when the lever element is operated, the first pawl engages the rack to drive a portion of the second body member towards a portion of the first body member a predetermined distance and, thereafter, the second pawl braces the first and second members against separation so that with repeated operation of the lever element, the roller assembly may be successively driven against the tire to lift wheel assembly to a desired height.

12. The apparatus of claim 11 wherein the actuator means includes direction control means for controlling operation of the actuator means so that when the direction control means is disposed in a first setting, repeated operation of the lever means will cause the wheel assembly to be lifted in predetermined increments to a desired height, and so that when the control means is disposed in a second setting, repeated operation of the lever elements will cause the wheel assembly held at a height to be lowered in successive predetermined increments.

13. The apparatus of claim 12 wherein the lever element is pivotally mounted proximate the first end of the first body member, and the first pawl has a first end for engaging the rack and a second end for engaging the direction control means, the first pawl being rotatably mounted at a point between the first pawl first and second ends, and the second pawl has a first end for engaging the rack and a second end for engaging the direction control means, the second pawl being rotatably mounted at the lever element pivot, at a point between the second pawl first and second ends, and wherein the direction control means includes a spring plate mounted at the lever element and free at the plate body to engage the first and second pawl, the direction controlling means further including a deflection member to space the spring plate from the second pawl when the deflection member is in a first position corresponding to the first setting of the direction control means and wherein the deflection member permits the spring plate to engage the second pawl when the deflection member is in a second position corresponding to the second setting of the direction control member.

14. The apparatus of claim 13 wherein the first body member is provided with an opening proximate the actuator lever element pivot mount, through which the first and second pawl extend to engage the rack, the rack being formed by a linear array of notches provided in and extending axially on the second body member, and wherein the lever means includes spring means mounted between the lever element and first body member for returning the lever to a first position following lever operation the first position of the lever being defined by a stop provided on the first body member against which the lever element is biased by the spring means.

15. The apparatus of claim 14 wherein the lever element is provided with a pedal so that the lever elements may be operated by foot.

16. A method for jacking and dollying a vehicle wheel assembly, the wheel assembly including a tire, wheel and axle, the method comprising:
locating a plurality of wheel assembly engaging elements, at least one of which includes a roller assembly, on a tire tread face at points on different sides of a wheel assembly vertical center line;
coupling the wheel assembly engaging elements with coupling members oriented in a plane substantially perpendicular to the tire tread face;
driving portions of the coupling members towards one another by leveraging for a predetermined distance the coupling member of one wheel engaging means from a fulcrum on the coupling member of another wheel engaging means;
following leveraging for a predetermined distance, locking one coupling member against separation from another coupling member by bracing one coupling member against another;
repeatedly and alternately driving portions of one coupling member towards to another and bracing one coupling member against another by repeated resetting and releveraging so as to successively drive the wheel assembly engaging elements against the tire tread to lift the wheel assembly and retain it at a desired height; and
transporting the wheel engaging means and wheel assembly once lifted as desired.

17. The method of claim 16 wherein the wheel assembly is lowered from the lifted position by releasing the bracing between one coupling member and another and permitting one coupling member to be withdrawn relative to another a predetermined distance by a weight of the wheel assembly until one coupling member is again braced against another, and, thereafter, repeatedly and alternately releasing and resetting the bracing so as to successively and controllably permit the wheel assembly to repulse the wheel assembly engaging elements until the wheel assembly is lowered a desired amount.

18. The method of claim 17 wherein the coupling members are driven and withdrawn within one another by leveraging the coupling members in a plane substantially parallel to the plane of the coupling members.

19. The method of claim 17 wherein the coupling members are driven one within another by manual leveraging.

20. The method of claim 17 wherein the coupling members are driven one within another by pedal leveraging.

* * * * *